(12) United States Patent
Milne

(10) Patent No.: US 11,261,752 B2
(45) Date of Patent: Mar. 1, 2022

(54) SAFETY APPARATUS

(71) Applicant: Siemens Energy Global GmbH & Co. KG, Bayern (DE)

(72) Inventor: Trevor Milne, Sheffield (GB)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/284,929

(22) PCT Filed: Aug. 12, 2019

(86) PCT No.: PCT/EP2019/071560
§ 371 (c)(1),
(2) Date: Apr. 13, 2021

(87) PCT Pub. No.: WO2020/088812
PCT Pub. Date: May 7, 2020

(65) Prior Publication Data
US 2021/0381393 A1   Dec. 9, 2021

(30) Foreign Application Priority Data
Oct. 30, 2018   (EP) ........................................ 8203327

(51) Int. Cl.
*F01D 21/04* (2006.01)
*F01D 5/06* (2006.01)

(52) U.S. Cl.
CPC .......... *F01D 21/045* (2013.01); *F01D 5/066* (2013.01); *F05D 2230/60* (2013.01); *F05D 2240/60* (2013.01); *F05D 2260/30* (2013.01)

(58) Field of Classification Search
None
See application file for complete search history.

(56) References Cited

U.S. PATENT DOCUMENTS 4,388,940 A * 6/1983 Powell ................... F16K 17/08
137/329.01
4,887,949 A   12/1989 Dimmick, III et al.
(Continued)

FOREIGN PATENT DOCUMENTS

| EP | 3647538 A1 * | 5/2020 | ........... F01D 21/045 |
| GB | 898164 A | 6/1962 | |
| WO | 2014195091 A1 | 12/2014 | |

OTHER PUBLICATIONS

International search report and written opinion dated Oct. 25, 2019 for corresponding PCT/EP2019/071560.

*Primary Examiner* — Michael Lebentritt
(74) *Attorney, Agent, or Firm* — Wolter Van Dyke Davis, PLLC

(57) ABSTRACT

A safety apparatus for containing a release of energy from a tension stud of a rotor assembly. The safety apparatus includes a containment member configured to pivot about a pivot location. The containment member includes a tail located on a first side of the pivot location, an elongate region on a second side of the pivot location, the elongate region defining a longitudinal axis and an arm located towards a distal end of the elongate region and projecting away from the longitudinal axis. The containment member is configured to be connected to a tool apparatus. In use, the containment member is configured to pivot between an open position and a containment position in which the arm overlaps with at least part of the tool apparatus in the direction of the longitudinal axis of the elongate region to contain the load energy within the safety apparatus.

15 Claims, 5 Drawing Sheets

(56) References Cited

U.S. PATENT DOCUMENTS

| | | | | |
|---|---|---|---|---|
| 5,796,202 | A * | 8/1998 | Herron | F01D 5/066 |
| | | | | 310/216.127 |
| 9,695,692 | B2 * | 7/2017 | Milne | F16B 31/06 |
| 2013/0125559 | A1 * | 5/2013 | Shepherd | F01D 5/066 |
| | | | | 60/796 |
| 2015/0078901 | A1 * | 3/2015 | Milne | F16B 35/041 |
| | | | | 416/196 R |
| 2016/0102556 | A1 * | 4/2016 | Twell | F01D 5/066 |
| | | | | 416/214 A |
| 2021/0164299 | A1 * | 6/2021 | Fong | E21B 17/06 |

* cited by examiner

SAFETY APPARATUS

CROSS REFERENCE TO RELATED APPLICATIONS

This application is the US National Stage of International Application No. PCT/EP2019/071560 filed 12 Aug. 2019, and claims the benefit thereof. The International Application claims the benefit of European Application No. EP18203327 filed 30 Oct. 2018. All of the applications are incorporated by reference herein in their entirety.

FIELD OF INVENTION

The present disclosure relates to a safety apparatus for containing loads applied to shaft arrangements particularly, but not exclusively for turbo engines and turbo-machines having a compressor, a turbine or a power turbine mounted to an axial shaft.

BACKGROUND

In gas turbine engines, compressors and turbines typically have axially arranged sets of rotors, each comprising an array of blades mounted to rotor discs. The respective sets of rotors are located between end shafts on a tension stud that extends through all or part of the set of rotors. In operation, the rotation of the rotors causes high separation forces to develop in the rotors. To counter these separation loads, a compression load is applied to the shaft and the rotors prior to use to offset the separation loads that develop in operation. To develop the compression load in the shaft and rotors, the tension stud is stretched during assembly to develop a tension within the tension stud. The tension stud is then held in its stretched form by a load retainer that engages with the shaft. The tension stud will react against the shaft via the load retainer to apply the compression load to the shaft.

Due to the high loads required to counter the separation loads encountered in operation, the risk of injury to assembly fitters as a result of failure of one or more components of the rotor assembly is high.

To overcome this problem, each component of the tooling assemblies is designed with a high factor of safety, which leads to increased size and weight of each component as well as increased expense. Further, each component is subject to regular non-destructive testing, which is time-consuming.

An alternative solution to overcome this problem is to utilise a robotic assembly to avoid interaction of an operator with the tool assembly during loading of the tension stud. However, this leads to significant expense.

Hence a need for improved safety when applying loads to a tension stud is highly desirable.

SUMMARY

According to the present disclosure there is provided an apparatus and method as set forth in the appended claims. Other features of the invention will be apparent from the dependent claims, and the description which follows.

According to a first aspect of the invention, there is provided a safety apparatus for containing a release of energy from a tension stud of a rotor assembly. The safety apparatus including a containment member configured to pivot about a pivot location. The containment member including a tail located on a first side of the pivot location, an elongate region on a second side of the pivot location, the elongate region defining a longitudinal axis and an arm located towards a distal end of the elongate region and projecting away from the longitudinal axis of the elongate region. The containment member is configured to be connected to a tool apparatus for applying a load energy to the tension stud. In use, the containment member is configured to pivot between an open position and a containment position in which the arm overlaps with at least part of the tool apparatus in the direction of the longitudinal axis of the elongate region to contain the load energy within the safety apparatus. Hence there is provided a safety apparatus suitable for containing a load applied to a tension stud of a rotor assembly in the event of a failure of one or more components and/or connections of the rotor assembly. The provision of the safety apparatus significantly reduces the risk to nearby workers and equipment as any energy released by a failure of one or more components will be restrained by the safety apparatus. Further, the provision of safety apparatus as part of the tool assembly avoids the necessity to redesign current components, which are already in operation.

The tail may be enlarged towards a proximal end and may be configured to engage with a lip of a shaft of a rotor assembly. Providing an enlarged region of the tail enables the safety apparatus to work with the existing geometry of the rotor assembly, i.e. no changes are required to the geometry of the rotor assembly.

In one example, the arm defines a second axis, wherein the longitudinal axis and the second axis are substantially perpendicular.

In one example, there is provided a tool assembly for applying a load to a tension stud of a rotor assembly. The tool assembly may include at least one safety apparatus and a tool apparatus. The tool apparatus may include a tool head for connecting to the tension stud, a compression body for engaging with a shaft of the rotor assembly and an actuator located between the tool head and compression body for applying a load to the tool head and the compression body. In this example, the at least one safety apparatus is connected to the tool apparatus and in the containment position at least part of the arm overlaps with at least part of the tool head in the direction of the longitudinal axis of the elongate region. The provision of the tool assembly including the safety apparatus enables the load to be applied to the tension stud and shaft of a rotor assembly in a safe manner.

The tool assembly may include two diametrically opposed safety apparatus connected to the tool apparatus. The provision of two diametrically opposed safety apparatus means that the energy released as a result of a failure will be shared between the two safety apparatus.

The tool assembly may include a biasing member configured to bias the containment member in the open position.

The tool head may include a removable insert and the removable insert may include a male thread for engaging with a co-operative female thread of the tool head and a female thread for engaging with a co-operative male thread of the tension stud. The removable insert may be made of a higher grade material compared with the rest of the tool head and so prolong the usable lifetime of the tool head.

In one example, the compression body includes a substantially cylindrical sidewall comprising an aperture. The provision of a substantially cylindrical sidewall comprising an aperture enables an operator to access the inside of the compression body. In one example, the operator is able to access a connector connected to a load retainer within the compression body.

The tool assembly may include a rotatable sleeve including a cam shaped outer profile. The tail of the containment member may be configured to engage with the outer profile of the rotatable sleeve such that rotation of the rotatable sleeve causes the containment member to move between the open position and the containment position. The sleeve with the cam shaped outer profile enables the containment member to be moved between the containment and open positions.

The rotatable sleeve may include at least one handle to enable the sleeve to be rotated.

In one example, the tool apparatus includes a location member and the sleeve comprises a slotted aperture configured to receive the location member, wherein the slotted aperture and location member are sized to restrict rotation of the sleeve through a pre-determined angle.

The tool assembly may include a measurement apparatus configured to measure the elongation of the tension stud. The measurement apparatus may be used to determine that the tension stud has extended by a pre-determined amount, equivalent to a pre-determined tension load being developed in the tension stud and hence, a pre-determined compression load being applied to the shaft.

According to another aspect of the invention, there is provided a method of applying a load to a tension stud of a rotor assembly, the method including connecting the tool head of the tool assembly to a tension stud, engaging the compression body of the tool assembly with a shaft of the rotor assembly, engaging the tail of the containment member with the shaft of the rotor assembly, moving the containment member of the safety apparatus to the containment position and actuating the actuator of the tool assembly to apply a compressive force to the tool head and the compression body to cause a tension load in the tension stud. This method enables a load to be safely applied to the tension stud.

The step of moving the containment member may include the step of rotating the sleeve.

The method may also include the steps of determining that the tension stud has elongated by a predetermined amount; and rotating a connector connected to a load retainer which is co-operatively threaded to the tension stud, wherein the load retainer is moved so that it engages with the shaft of the rotor assembly.

BRIEF DESCRIPTION OF THE DRAWINGS

Examples of the present disclosure will now be described with reference to the accompanying drawings, in which.

DETAILED DESCRIPTION

Figure 1:
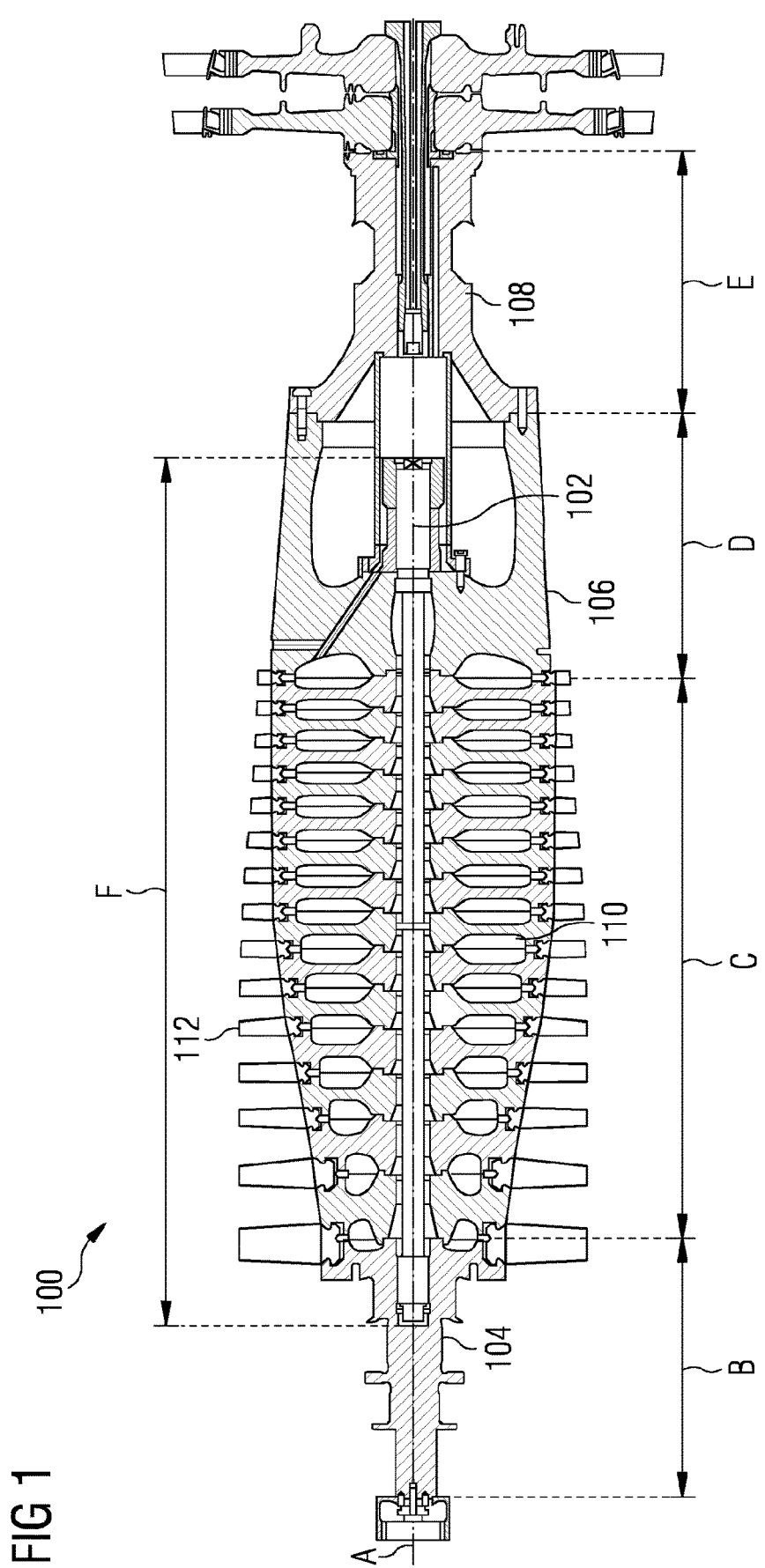
FIG. 1 shows a schematic of a gas turbine arrangement.

FIG. 1 shows an example of a rotor assembly 100 of a gas turbine engine. A tension stud or tension bolt 102 is provided in the axial centre of the rotor assembly 100, along an axis A of rotation of the rotor assembly 100. In one example, the turbine engine is an SGT-200.

In operation, the rotor assembly 100 is arranged to rotate about the axis A of rotation. All rotor parts shown in the figures may be substantially rotationally symmetric about the axis A of rotation. Stator parts are not shown in the figures and elements that interlock the rotors may not be shown in the figures.

The rotor assembly 100 includes one or more shaft elements 104, 106, 108, for example, an inlet shaft 104, an intermediate shaft 106 and an exit shaft 108. In the example shown in FIG. 1, the inlet shaft 104 extends in region B, a compressor disc and rotor arrangement extends in region C, the intermediate shaft 106 extends in region D and the exit shaft 108 extends in region E.

One or more shaft elements 104, 106, 108 and compressor discs 110 are provided around the tension stud 102 and configured to rotate about the axis A of rotation.

The shaft elements 104, 106, 108 and the compressor discs 110 may be interlocked axially between axially adjacent rotating parts. For example, the shaft elements 104, 106, 108 and the compressor discs 110 may comprise corresponding teeth that mesh together to interlock the shaft elements 104, 106, 108 and the compressor disc 110. A plurality of rotor blades 112 are held in place by the compressor discs 110. In one example, a rotor blade 112 comprises a "t-shaped" root that is held in place between correspondingly shaped sections of the compressor discs 110. In other examples, the rotor blades 112 may extend from the compressor discs 110 themselves in the form of a blisk. As such, the tension stud 102, the shaft elements 104, 106, 108 the compressor discs 110 and the rotor blades 112 may rotate together at the same speed about the axis A of the rotor. The tension stud 102 may be rotated into a threaded engagement into a threaded bore of the inlet shaft 104 or alternatively be received in a retention nut (not shown), which engages with the inlet shaft 104.

In one example of assembly, the inlet shaft 104 is mounted vertically in a frame and the rotor assembly 100 is constructed in a top-down vertical orientation. In another example, the inlet shaft 104 is mounted horizontally in a frame and the rotor assembly 100 is constructed in a horizontal orientation.

A series of rotor blades 112 are mounted into a groove of the inlet shaft 104 and then a compressor disc 110 is slid over the tension stud 102 to hold the rotor blades 112 in place. This process is repeated to provide a series of stages of rotor blades 112 held in place between a plurality of adjacent compressor discs 110. The intermediate shaft 106 is then mounted onto the tension stud 102 and receives the tension stud 102 in a bore through the intermediate shaft 106. The tension stud 102 has an exposed end protruding out from the intermediate shaft 106 to allow a tool apparatus 118 to be connected and apply a load energy to the tension stud 102, prior to the exit shaft 108 being added to the rotor assembly 100.

Figure 2:
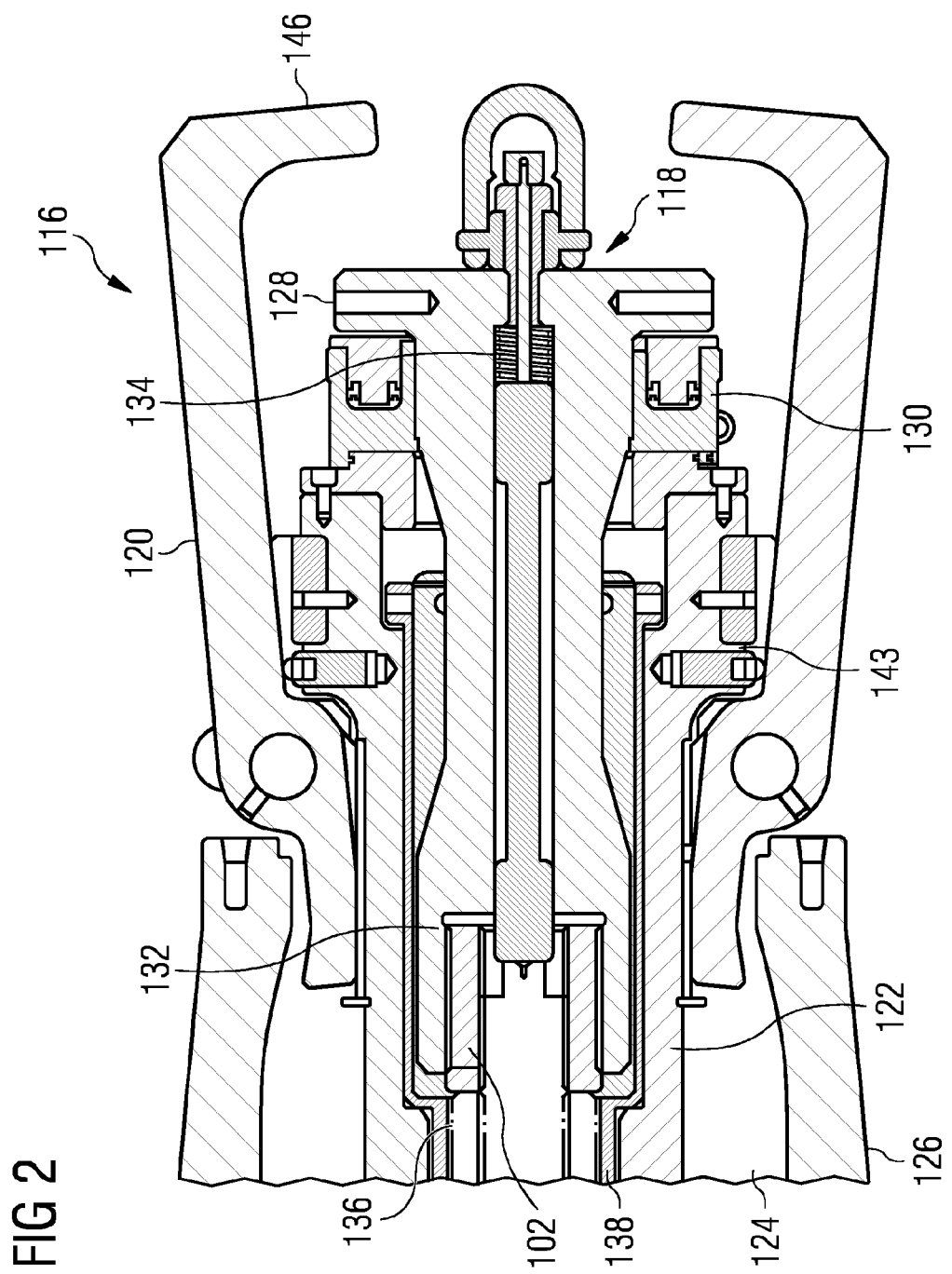
FIG. 2 shows a cross section of a schematic of part of the rotor assembly and a tool assembly.

FIG. 2 shows a cross section of a schematic of part of the rotor assembly 100 along with a tool assembly 116 for applying a load energy to the tension stud 102.

The tool assembly 116 includes a tool apparatus 118 and a safety apparatus 120.

The tool apparatus 118 includes a compression body 122 configured to engage with one or more of the shaft elements 104, 106, 108 of the rotor assembly 100. In one example, the compression body 122 is configured to engage with the intermediate shaft 106 of the rotor assembly 100. The compression body 122 has a profile at one end that may correspond with a shape of one end of the intermediate shaft 106 to ensure a positive engagement between the compression body 122 and the intermediate shaft 106. The compression body 122 may be received in a cavity 124 defined by a shaft wall 126 of the intermediate shaft 106.

The compression body 122 may be substantially cylindrical with an axial hole therethrough such that one end of the tension stud 102 may be received in the compression body 122. The compression body 122 may have substantially cylindrical shaped walls which may include an aperture to enable access to the inside of the compression body 122.

The tool apparatus 118 includes a tool head 128 configured to connect to the tension stud 102. The tool head 128 may be substantially cylindrical and include a first region having a first diameter and a second region having a second, smaller diameter, creating a lip to enable an actuator 130 to engage with the tool head 128 and exert a load thereon. The compression body 122 is sized to receive at least part of the tool head 128 within the axial hole of the compression body 122.

In FIG. 2, the tool head 128 is engaged with the tension stud 102. In one example, the tool head 128 includes a female threaded connection which is configured to engage with a corresponding male threaded connection on the tension stud 102.

Within the tool apparatus 118 there are critical cyclic life components that require monitoring during their repeated use, the female thread of the tool head 128 that engages with the tension stud 102 is one such component. To minimise the cost of replacing the entire tool head 128 once the internal female thread of the tool head 128 has worn to an undesirable state, the tool head 128 may include a removable insert 132 such that the tool head 128 is connected to the tension stud 102 via the removable insert 132. In one example, the removable insert 132 includes a male thread for engaging with a co-operative female thread within the tool head 128 and a female thread for engaging with a co-operative male thread of the tension stud 102. The removable insert 132 may be economically made from higher grade material compared with the remainder of the tool head 128. Further, the removable insert 132 may be changed-out with a spare or replacement removable insert 132 whilst the original is away for inspection. This enables continued use of tool apparatus 118 whilst the original removable insert 132 is being inspected. Further, the removable insert 132 may comprise a non-shouldered outer thread, which enables its reversal. As such, the usable life of the removable insert is extended because the redundant thread is utilised.

The tool apparatus 118 includes an actuator 130 configured to apply a load to the tool head 128 and the compression body 122. The actuator 130 may have an axial hole therethrough for receiving at least part of the tool head 128.

The tool apparatus 118 may include a measurement apparatus 134 for measuring the stretch or elongation of the tension stud 102. The measurement apparatus 134 will be explained in more detail below.

The rotor assembly 100 includes a load retainer 136 and a connector 138, which will be explained in more detail below.

In FIG. 2, the safety apparatus 120 is located in an open position to enable access to the tool apparatus 118.

Figure 3:
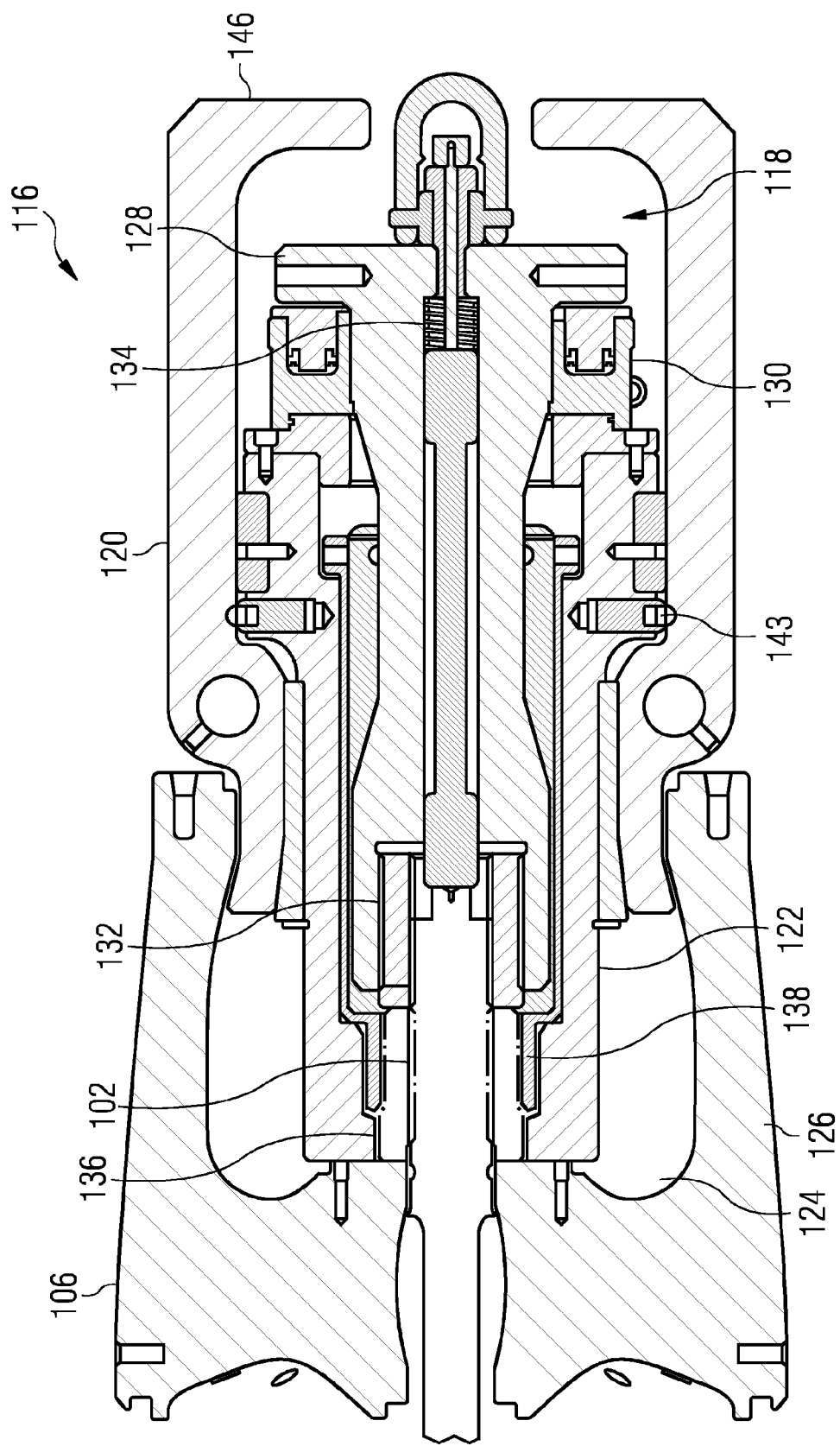
FIG. 3 shows a cross section of a schematic of part of the rotor assembly and a tool assembly.

FIG. 3 shows a cross section of a schematic of part of the rotor assembly 100 along with the tool apparatus 118 for applying a load to the tension stud 102. In the example shown in FIG. 3, the tool head 128 is engaged with the tension stud 102 via the replaceable tool insert 132 and the safety apparatus 120 is shown in a containment position.

In the example shown in FIG. 3, the tool head 128 is received in the through hole in the compression body 122 and the removable insert 132 is engaged with the tension stud 102. In the arrangement shown in FIG. 3, the actuator 130 is engaged with the tool head 128 and the compression body 122. In operation, the actuator 130 is configured to expand to push against the tool head 128 and the compression body 122 and exert a load on the tool head 128 and the compression body 122. As the compression body 122 is engaged with the intermediate shaft 106 of the rotor assembly 100, the force applied to the compression body 122 will be reacted by the intermediate shaft 106 and the intermediate shaft 106 will also be subject to compression.

In one example, the actuator 130 is a hydraulic load cell to accurately apply a pre-determined load to the tension stud 102. In other examples, the actuator 130 may be a pneumatic load cell, a torqued threaded arrangement or an electric solenoid.

Due to the connection between the tool head 128 and the tension stud 102, the load applied to the tool head 128 results in an extension of the tension stud 102 and a tension load to develop in the tension stud 102.

The load applied to the tension stud 102 is pre-determined to match the 'steady state' separation loads experienced in operation of the rotor assembly 100. In one example, to determine the tension load applied to the tension stud 102, a change in length or extension of the tension stud 102 is measured by a measurement device 134. The measurement device 134 may include a sliding plunger that projects through a bore in the tool head 128 and engages with an end of the tension stud 102. The measurement device 134 may have an exposed end that projects from the tool head 128. In one example, the measurement device 134 includes a spring to bias the plunger against the tension stud 102. The exposed end of the measurement device 134 may be fixed such that the elongation or extension of the tension stud 102 may be measured due to the corresponding reduction in length of the measurement device 134.

Due to the stress-strain relationship, a pre-determined tension load can be provided to the tension stud 102 by stretching the tension stud 102 by a predetermined amount.

Once the tension stud 102 has been extended by a pre-determined amount, corresponding to a pre-determined tension load being developed in the tension stud 102, a load retainer 136 is moved to engage with the intermediate shaft 106. The load retainer 136 is moved relative to the tension stud 102 to engage with the intermediate shaft 106. In one example, a connector 138, which may be in the form of a spinner, is connected with the load retainer 136 to enable an operator to move the load retainer 136 relative to the tension stud 102, without the need for the operator to have direct access to the load retainer 136. In one example, the load retainer 136 comprises a threaded nut configured to receive a corresponding thread on the tension stud 102.

In order to access the connector 138, the wall of the compression body 122 may include an aperture to enable access to the inside of the compression body 122.

Following the engagement of the load retainer 136 with the intermediate shaft 106, the actuator 130 may be unloaded. During unloading, the load path between the tension stud 102 and the intermediate shaft 106 is changed from passing through the compression body 122 to passing through the load retainer 136. In other words, the compression body 122 becomes unloaded as the actuator 130 is unloaded and the load retainer 136 becomes loaded as the actuator 130 is unloaded.

Once the actuator 130 has been fully unloaded, the tool apparatus 118 may be safely removed.

In operation, depending on the size of the rotor assembly 100, the rotor assembly 100 may be subject to separation loads of approximately 50 kN. In other examples, the separation loads may be more than 250 kN, more advantageously more than 500 kN, more advantageously more than 750 kN and more advantageously more than 1000 kN. To compensate against this separation load, the tension stud 102 will be subject to a matching tension load. As such, the components of the tool apparatus 118 and rotor assembly 100 will also be subject to high loads. Whilst the components are designed to withstand the loads applied to them, in practice, there are a number of reasons why failures in the components and/or connections of the rotor assembly 100 that are subject to a load may occur.

A first source of potential failure is that one or more threads between connecting elements may fail. For example, the thread between the load retainer 136 and the tension stud 102 may fail, causing the load energy within the tension stud 102 to be released.

Alternatively, the threads between the removable insert 132 and either the corresponding thread of the tool head 128 or the corresponding thread of the tension stud 102 may fail during loading of the tension stud 102, which causes the load from the actuator 130 to be unrestrained at one end.

In another example, there may be a lack of engagement between the compression body 122 and the intermediate shaft 106 or the actuator 130 and the tool head 128 or the compression body 122.

Further, the load applied by the actuator 130 may be too high, resulting in a failure of one or more components and/or connection between components.

In each of these examples, a release of energy occurs, which may cause injury to a nearby operator or damage to nearby equipment. The energy released may be between approximately 1500 J to 4000 J and so the safety apparatus 120 is designed to withstand and contain this release of energy.

Figure 4:
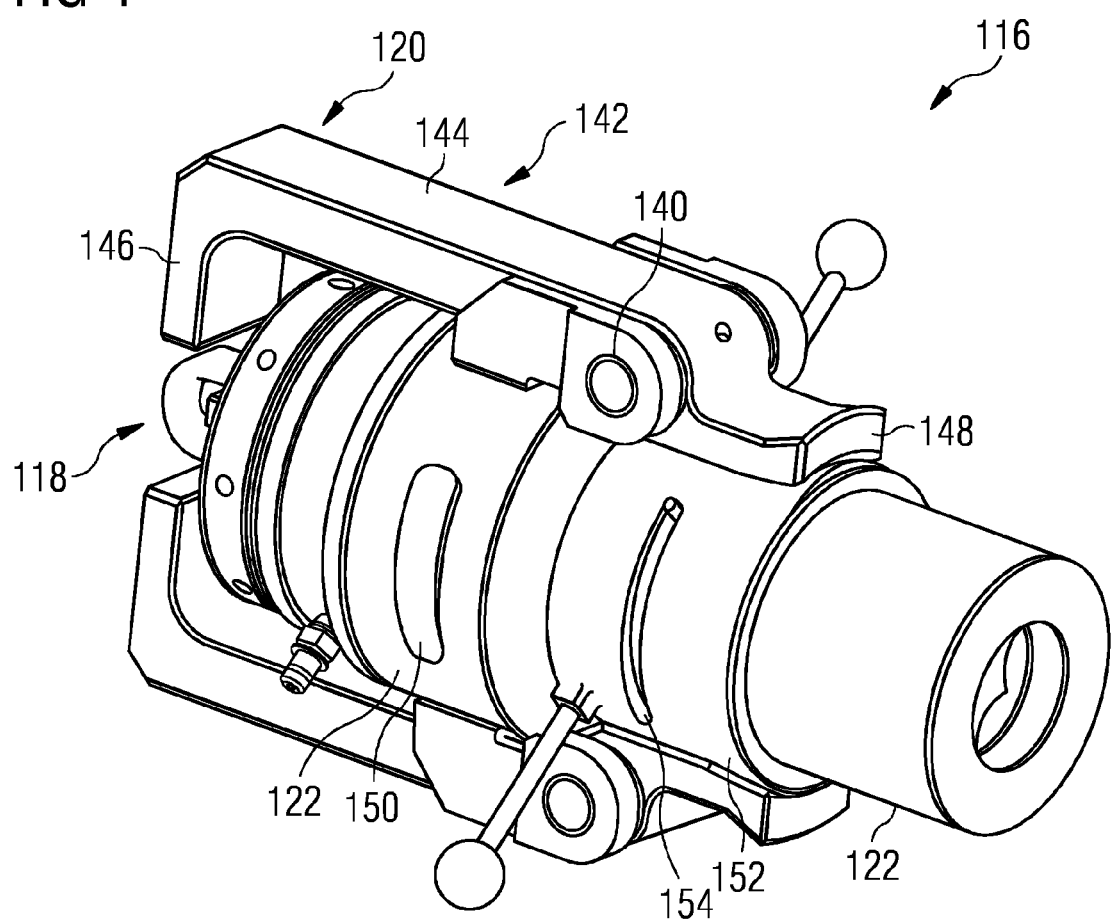
FIG. 4 shows a perspective view of a tool assembly.

FIG. 4 shows an example of the tool assembly 116 including a tool apparatus 118 and a safety apparatus 120. In the example shown in FIG. 4, the tool assembly 116 includes two safety apparatus 120 arranged diametrically opposite on the tool apparatus 118. However, other arrangements of safety apparatus 120 are possible; for example, the tool assembly 116 may have more or fewer than two safety apparatus 120.

The safety apparatus or catcher arm 120 is used with the tool apparatus 118 to safely apply a tension load to the tension stud 102 with a reduced risk of an energy release outside of the tool assembly 116 as the safety apparatus 120 will contain the load energy released from the tension stud 102 due to a failure of one or more components.

Where possible all components of the tool apparatus 118 are designed to meet mechanical strength requirements for a given cyclic life with acceptable safe working margins. At a given time during assembly, operators must access the tool assembly 116 (i.e. measuring stretch and dismantling tooling). During this time, it is especially essential to provide a second-tier of safety to "fool-proof" against failure scenarios such as accidental over pressure of the actuator and/or damaged or worn threads. This is achieved by the addition of safety apparatus 120 attached to the tool apparatus 118. In the event of a component failure the safety apparatus 120 are configured to contain to the energy released from the tension stud 102.

The safety apparatus 120 includes containment member 142 configured to pivot about a pivot location. In one example, the pivot 140 is part of the containment member 142, but in other examples, the pivot 140 is part of the tool apparatus 118 and the containment member 142 is merely connected to the pivot 140.

In the example shown in FIG. 4, the pivot 140 has a pivot housing that is configured to connect to the tool apparatus 118. In one example, the containment member 142 is connected to the compression body 122 of tool apparatus 118.

The containment member 142 includes an elongate region 144 on a first side of the pivot 140. The elongate region 144 defines a longitudinal axis. In one example, the longitudinal axis of the elongate region 144 is substantially parallel to the rotational axis A of the rotor assembly 100 when the containment member 142 is in a containment position as shown in FIG. 4.

In one example, the elongate region 144 has a rectangular cross section, but any suitable shape may be used.

The containment member 142 also includes an arm or catch 146, such as a retaining arm, located towards a distal end of the elongate region 144. In one example, the arm 146 is located at the distal end of the elongate region 144. The elongate region 144 and arm 146 may be part of the same component, i.e. integral, or, alternatively, they may be distinct components that are joined together. The arm 146 projects away from the longitudinal axis of the elongate region 144. In one example, the arm 146 defines a second axis. The longitudinal axis defined by the elongate region 144 and the second axis defined by the arm 146 may be substantially perpendicular.

In the example of FIG. 4 in which two safety apparatus 120 are shown, the arm 146 of a first safety apparatus 120 may project towards the arms 146 of the second safety apparatus 120 put another way, arms 146 of different safety apparatus 120 may project towards each other.

The containment member 142 is configured to pivot about a pivot location 140 between a first position in which the elongate region 144 and the arm 146 are in a containment position for containing a load applied to a tension stud 102 of a rotor assembly 100, as shown in FIG. 3, and a second, open position in which the elongate region 144 and the arm 146 are in an open position, as shown in FIG. 2. In the containment position, at least part of the arm 146 overlaps with at least part of the tool apparatus 118, such as the tool head 128, in the direction of the longitudinal axis of the elongate region 144 to contain the load within the tension stud 102. When the containment member 142 is in the second, open position, the containment member 142 is not configured to contain loads therein. The operator will have access to the tool apparatus 118 to allow the tool apparatus 118 to be connected with the tension stud 102 and engage the compression body 122 with the intermediate shaft 106.

In one example, the material of the safety apparatus 120 is a nickel chromium molybdenum steel, which is advantageously due to its high tensile strength and toughness.

In order to retain the loads that may be applied to the safety apparatus 120 as a result of an energy release, the elongate region 144 and arm 146 of the safety apparatus 120 are sized so as to withstand the loads that may be released as a result of a failure of one or more components. In one example, the safety apparatus 120 has a length of approximately 400 mm to 600 m and a cross-sectional area of approximately 3200 $mm^2$ to 5000 $mm^2$. Further, the arm 146 of the safety apparatus will be subject to high shear loads during an energy released and has a cross sectional area of approximately 2400 $mm^2$ to 3200 $mm^2$.

The tool assembly 116 may include a biasing member 143, such as a pre-loaded spring, configured to bias the containment member 142 in the open position.

The containment member 142 includes a tail 148 located on second side of the pivot 140 such that the tail 148 is on the opposite side of the pivot to the elongate region 144 and arm 146. In one example, the tail 148 is enlarged towards a proximal end. In use, the tail 148 is inserted into the cavity 124 defined by the shaft wall 126 such that enlarged portion may engage with a circumferential lip of the shaft wall 126. When the tail 148 is engaged in the lip of the shaft wall 126, the containment member 142 will be locked in the containment position such that the arm 146 of the containment member 142 overlaps with the tool head 128. The engagement between the tail 148 and the shaft wall 126 is sufficient to hold the tool assembly 116 in position in the event of a failure of one or more components causing the release of load energy from the tension stud 102.

As well as providing an engagement point between the containment member 142 and the shaft wall 126, the position of the containment member 142 may also be controlled via movement of the tail 148.

The elongate region 144 and the arms 146 are sized such that they can withstand the various loads resulting from a failure and release of energy of one or more components of the tool apparatus 118 and/or rotor assembly 100 whilst the load is applied to the tension stud 102 or after the load has been applied to the tension stud 102.

In the example of the tool assembly shown in FIG. 4, the compression body 122 includes a substantially cylindrical sidewall that includes an aperture 150 to enable access to the connector (not shown) inside the compression body 122.

The tool assembly 116 may also include a sleeve 152 located between the compression body 122 and the containment member 142. In one example, the sleeve 152 is rotatable and has a cam shaped outer profile. As the tail 148 of the containment member 142 is engaged with the sleeve 152, for example via abutment, rotation of the sleeve 152 causes the tail 148 to move due to the cam-shaped outer profile of the sleeve 152. In one example, rotation of the sleeve 152 causes the containment member 142 to move between the open position and the containment position.

Figure 5:
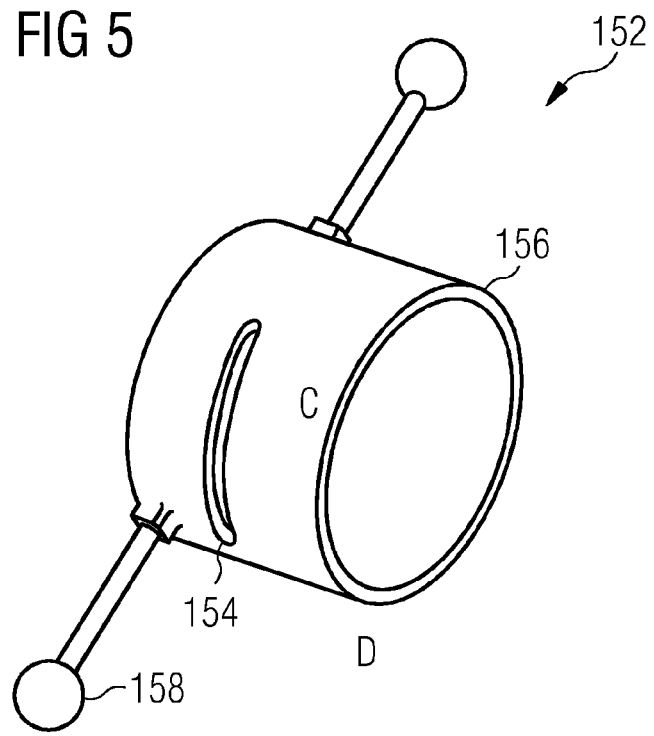
FIG. 5 shows a perspective view of a sleeve of a tool assembly.

FIG. 5 shows an example of the sleeve 152. As described above, the sleeve 152 has a cam shaped outer profile 156 that enables the tail 148 of the containment member 142 to be moved between a first position, in which the containment member 142 is in a containment position and a second position in which the containment member 142 is in an open position.

As shown in FIG. 5, the cam-shaped outer profile has a first width C and a second width D. When the sleeve 152 is rotated such that the tail 148 is engaged with the section C, then the containment member 142 will be in an open position and when the sleeve 152 is rotated such that the tail 148 is engaged with the section D, then the containment member 142 will be in a containment position.

The sleeve 152 may include one or more handles 158 to rotate the sleeve 152 to cause the containment member 142 to move. The one or more handles 158 may be fixed relative to the sleeve 152. In order to limit the range of movement of the sleeve 152, the tool assembly 116 may include a location member (not shown) that is received within a slotted aperture 154 in the sleeve 152. In this example, the slotted aperture 154 and the location member are sized to restrict rotation of the sleeve 152 through a pre-determined angle, such as 90 degrees.

Figure 6:
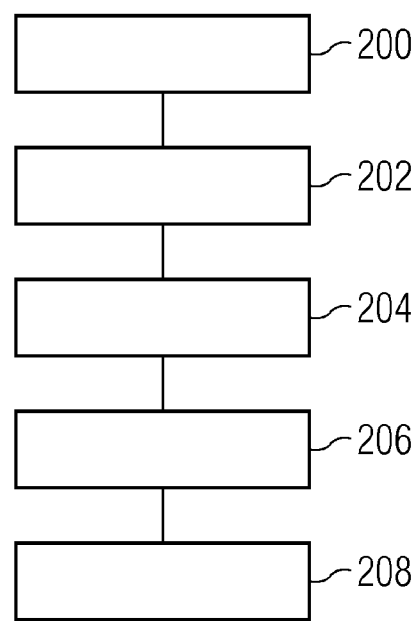
FIG. 6 shows a flow diagram of steps of a method of applying a load to a tension stud of a rotor assembly.

FIG. 6 shows an illustration of a method of applying a load to a tension stud 102 of a rotor assembly.

In step 200, the tool head 128 of the tool assembly 116 is connected with the tension stud 102. In one example, the tool head 128 includes a removable insert 132 comprising a hollow cylinder in which both the outside face and the inside face of the hollow cylinder are threaded. The thread on the outer face of the removable insert 132 may connect with a corresponding thread of a cavity within the tool head 128 for receiving the removable insert 132. The thread on the internal face of the removable insert 132 may connect with a corresponding thread on the tension stud 102.

In step 202, the compression body 122 is provided to engage with the intermediate shaft 106. The compression body 122 may have one end that is shaped to match a corresponding profile on the intermediate shaft 106 such that a positive engagement occurs.

In step 204, the tail 148 of the containment member 142 is engaged with the intermediate shaft 106. In one example, the tail 148 has an enlarged region at a proximal end which is shaped to fit the profile of the wall 126 of the intermediate shaft 106. The tail 148 may be moved into engagement by rotating the sleeve 152, for example, by rotating the one or more handles 158.

In step 206, the containment member 142 is moved into the containment position wherein the arm 146 of the containment member 142 overlaps with at least part of the tool apparatus 118 such that any release of energy from the tension stud or other components will be contained by the containment member 142. In one example, the containment member 142 is moved simultaneously with the movement of the tail 148.

In step 208, the actuator 130 is actuated to apply a load to the tool head 128 and the compression body 122 to cause a tension load to develop in the tension stud 102.

In a further step, the method may include measuring the elongation of the tension stud 102 via measurement apparatus 134. The method may further include determining that the tension stud 102 has elongated by a predetermined amount and rotating the load retainer 136 which is co-operatively threaded to the tension stud 102. The load retainer 136 is moved so that it engages with the shaft 106 of the rotor assembly 100.

In one example, a resilient material, such as rubber, is provided between the arm 146 of the safety apparatus 120 of the tool assembly 116 and the components of the tool apparatus 118. For example, resilient material may be provided between the arm 146 and the tool head 128.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A safety apparatus for containing a release of energy from a tension stud of a rotor assembly, the safety apparatus comprising:
a containment member configured to pivot about a pivot location, the containment member comprising: a tail located on a first side of the pivot location; an elongate region on a second side of the pivot location, the elongate region defining a longitudinal axis; and an arm located towards a distal end of the elongate region and projecting away from the longitudinal axis of the elongate region,
wherein the containment member is configured to be connected to a tool apparatus for applying a load energy to the tension stud,
wherein in use, the containment member is configured to pivot between an open position and a containment position in which the arm overlaps with at least part of the tool apparatus in the direction of the longitudinal axis of the elongate region to contain the load energy within the safety apparatus.

2. The safety apparatus according to claim 1, wherein the tail is enlarged towards a proximal end and is configured to engage with a lip of a shaft of a rotor assembly.

3. The safety apparatus according to claim 1, wherein the arm defines a second axis, wherein the longitudinal axis and the second axis are substantially perpendicular.

4. A tool assembly for applying a load to a tension stud of a rotor assembly, comprising:
at least one safety apparatus according to claim 1; and
a tool apparatus comprising:
a tool head for connecting to the tension stud;
a compression body for engaging with a shaft of the rotor assembly; and
an actuator located between the tool head and compression body for applying a load to the tool head and the compression body,
wherein the at least one safety apparatus is connected to the tool apparatus,
wherein in the containment position at least part of the arm overlaps with at least part of the tool head in the direction of the longitudinal axis of the elongate region.

5. The tool assembly of claim 4, comprising:
two diametrically opposed safety apparatus connected to the tool apparatus.

6. The tool assembly of claim 4, further comprising:
a biasing member configured to bias the containment member in the open position.

7. The tool assembly according to claim 4, wherein the tool head comprises a removable insert, the removable insert comprising:
a male thread for engaging with a co-operative female thread of the tool head; and
a female thread for engaging with a co-operative male thread of the tension stud.

8. The tool assembly according to claim 4, wherein the compression body comprises a substantially cylindrical sidewall comprising an aperture.

9. The tool assembly according to claim 4, further comprising:
a rotatable sleeve comprising a cam shaped outer profile, wherein the tail of the containment member is configured to engage with the outer profile of the rotatable sleeve such that rotation of the rotatable sleeve causes the containment member to move between the open position and the containment position.

10. The tool assembly according to claim 9, wherein the rotatable sleeve comprises at least one handle to enable the sleeve to be rotated.

11. The tool assembly according to claim 9, wherein tool apparatus comprises a location member and the sleeve comprises a slotted aperture configured to receive the location member, wherein the slotted aperture and location member are sized to restrict rotation of the sleeve through a pre-determined angle.

12. The tool assembly according to claim 4, further comprising:
a measurement apparatus configured to measure the elongation of the tension stud.

13. A method of applying a load to a tension stud of a rotor assembly, the method comprising:
connecting the tool head of the tool assembly of claim 4 to a tension stud;
engaging the compression body of the tool assembly with a shaft of the rotor assembly;
engaging the tail of the containment member with the shaft of the rotor assembly;
moving the containment member of the safety apparatus to the containment position; and
actuating the actuator of the tool assembly to apply a compressive force to the tool head and the compression body to cause a tension load in the tension stud.

14. The method according to claim 13, wherein the step of moving the containment member comprises rotating a rotatable sleeve comprising a cam shaped outer profile, wherein the tail of the containment member is configured to engage with the outer profile of the rotatable sleeve such that rotation of the rotatable sleeve causes the containment member to move between the open position and the containment position.

15. The method according to claim 14, further comprising:
determining that the tension stud has elongated by a predetermined amount; and
rotating a connector connected to a load retainer which is co-operatively threaded to the tension stud, wherein the load retainer is moved so that it engages with the shaft of the rotor assembly.

* * * * *